United States Patent

Flaherty et al.

[15] 3,638,765
[45] Feb. 1, 1972

[54] DISC BRAKE WITH NOISE ARRESTER

[72] Inventors: Bernard M. Flaherty, Birmingham; Lewis L. Knight, Allen Park, both of Mich.

[73] Assignee: Ford Motor Company, Dearborn, Mich.

[22] Filed: Mar. 18, 1970

[21] Appl. No.: 20,692

[52] U.S. Cl. ...........................................................188/73.5
[51] Int. Cl. ..........................................................F16d 65/00
[58] Field of Search............................188/73.5, 73.6, 205 A

[56] References Cited

UNITED STATES PATENTS 3,485,325  12/1969  Miles....................................188/73.6
3,490,563  1/1970   Hahm....................................188/73.5
3,506,098  4/1970   Anders..................................188/73.5

*Primary Examiner*—George E. A. Halvosa
*Attorney*—John R. Faulkner and Roger E. Erickson

[57] ABSTRACT

A disc brake including a noise arrester means that dampens vibrations between the brake pad backing plate and the caliper assembly. The noise arrester comprises a spring metal clip that engages the end of the backing plate and exerts a spring force on an abutment tab protruding from the backside of the brake pad backing plate.

7 Claims, 4 Drawing Figures

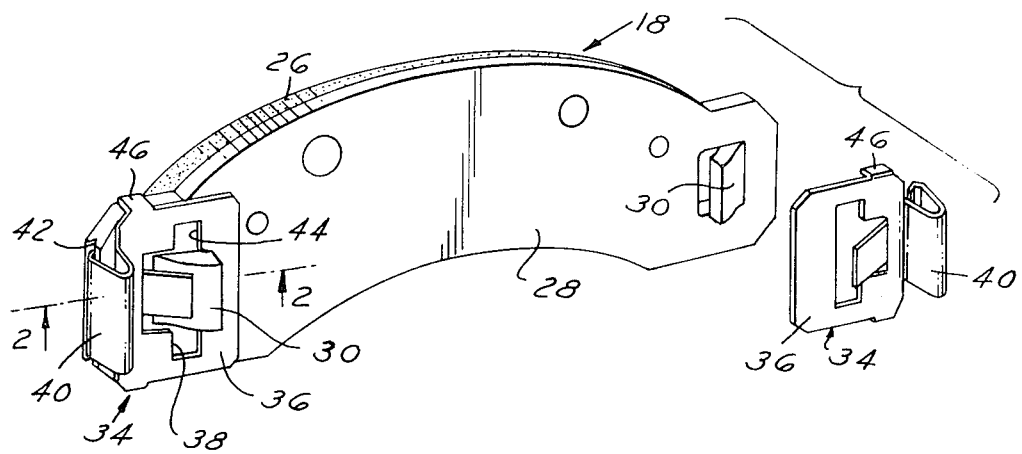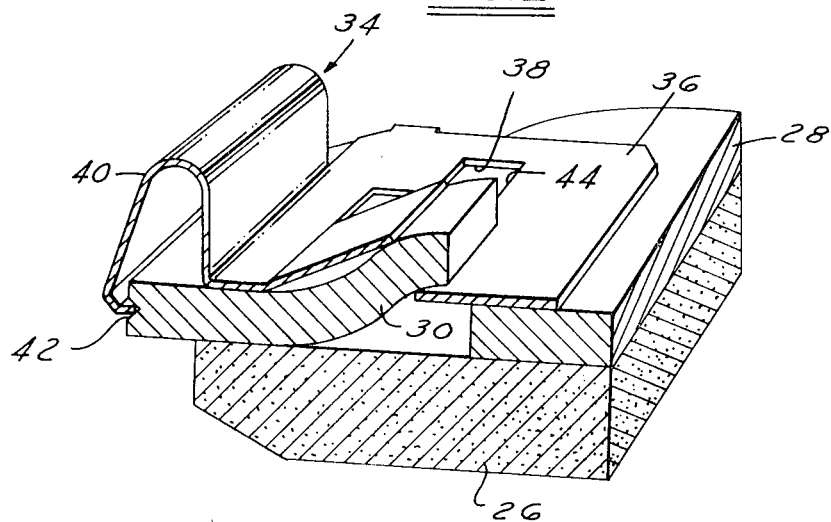

INVENTORS
B. MICHAEL FLAHERTY
LEWIS L. KNIGHT
BY John R Faulkner
Roger E Erickson
ATTORNEYS

DISC BRAKE WITH NOISE ARRESTER

BACKGROUND OF THE INVENTION

Automotive vehicles equipped with disc brakes may under certain conditions experience brake squeal during light brake applications. Such a squeal is generally caused by high-frequency vibrations of the metal backing plate of the brake pad against the caliper assembly.

One attempted solution to this problem has been to cover the backside of the backing plate with a thin layer of an asbestos or similar insulating material. This method is not completely satisfactory as it is not possible to effectively insulate the high force transmission areas of the backing plate.

This invention provides a disc brake construction including a noise arrester which dampens vibrations between the pad backing plate and the caliper assembly so as to reduce causes of brake squeal. It also provides a noise arrester not subject to wear as would be an asbestos insulating layer. Furthermore, this invention provides a noise arrester for a disc brake which can be installed either in initial production or as a service item and which is economical to manufacture and reliable in operation.

SUMMARY OF THE INVENTION

A disc brake constructed in accordance with this invention includes a caliper member, a pad assembly including a metal backing plate, one or more abutment tabs protruding from the backside of the backing plate engageable with the caliper assembly. Secured to the backside of the backing plate is a noise arrester clip having a shimlike portion engageable with an abutment tab and a spring portion engageable with an end of the backing plate. The spring portion urges an edge of the shimlike portion into engagement with the abutment tab. The shimlike portion may be bonded to the backing plate.

BRIEF DESCRIPTION OF THE DRAWINGS

FIG. 1 is an elevational view of a brake pad assembly showing the metal backing plate and the noise arrester clip attached thereto.

FIG. 2 is a cross section taken through line 2—2 of FIG. 1.

DETAILED DESCRIPTION OF THE PREFERRED EMBODIMENT

Figure 3:
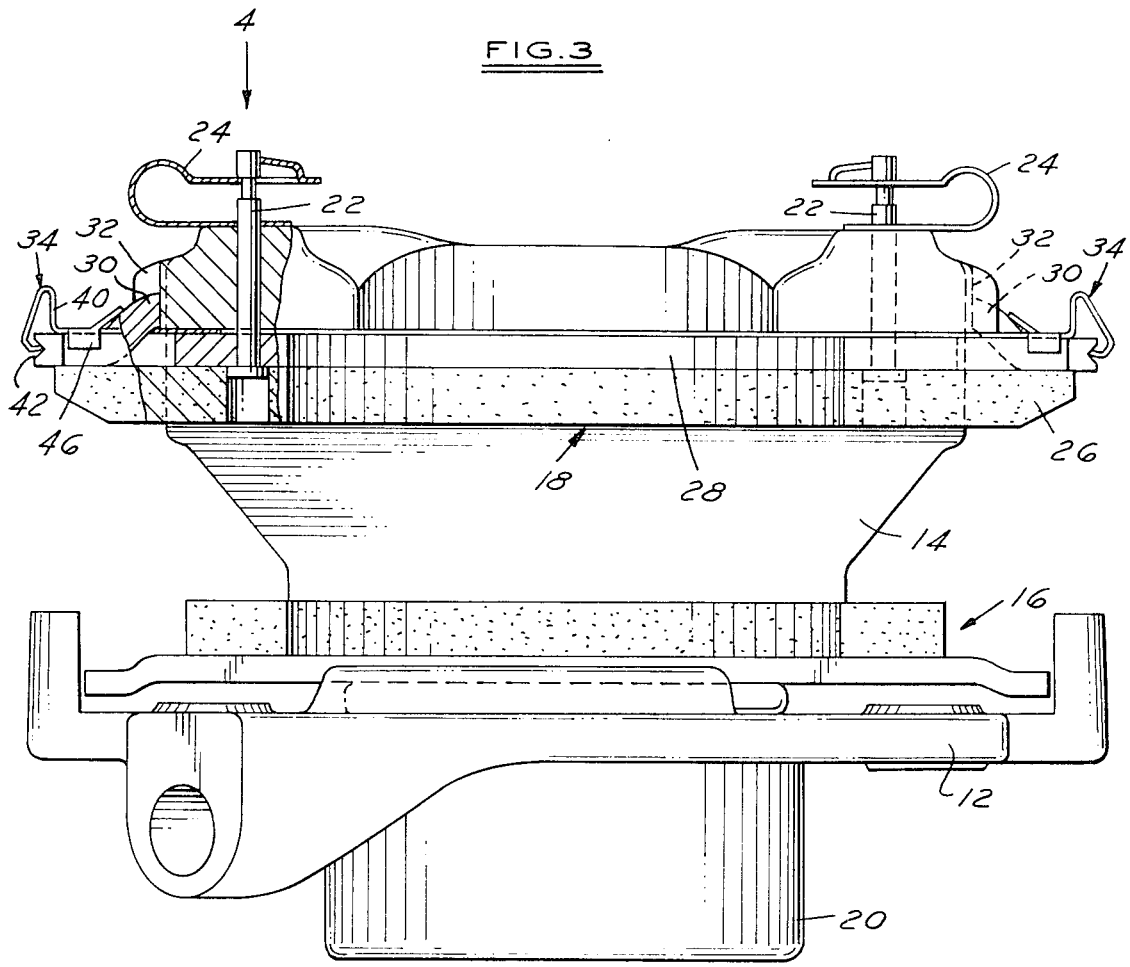
FIG. 3 is a bottom view with portions removed of a disk brake caliper assembly embodying the invention.

A disc brake floating-type caliper assembly, shown in FIG. 3, includes an anchor plate 12, a caliper member 14 slidably connected to the anchor plate, an inner brakeshoe or pad assembly 16 and an outer brakeshoe or pad assembly 18. The anchor plate includes a housing 20 which slidably receives an actuating piston (not shown). The piston upon actuation urges the inner pad assembly 16 toward the outer pad assembly 18 so that the brake rotor (not shown) attached to a vehicle wheel is engaged and vehicle braking is effected. The caliper member 14, being slidably mounted relative to the anchor plate 12, together with the pad assemblies provide a balanced clamping of the brake rotor. A pair of pins 22 and clips 24 secure the outer brake pad assembly 18 to the outer portion of the caliper member 14.

Figure 4:
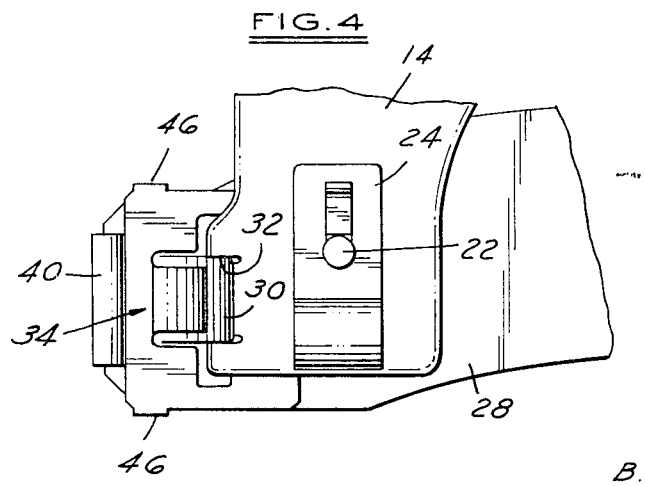
FIG. 4 is a side view of a portion of the caliper member 14 in the direction of arrow 4 in FIG. 3. Clip 24 is shown displaced 90° from its position in FIG. 3 to unobstructedly show slot 32.

The outer brake pad assembly 18 comprises a friction pad 26 bonded to a metal backing plate 28. A pair of abutment tabs 30 protrude obliquely from the backside of the backing plate and extend into a pair of corresponding axially disposed slots 32 formed in the caliper member. These tabs function as reaction abutments to transfer tangential forces from the brake rotor through the shoe assembly to the caliper member. Abutment tabs such as these have been found to be a source of high-frequency squeal vibrations upon light brake application. It has been further found that these vibrations map be dampened to the extent that they no longer produce an audible squeal by the use of a noise arrester such as shown in detail in FIGS. 1 and 2 of the drawing, and installed in the caliper assembly as shown in the FIGS. 3 and 4 of the drawings.

The noise arrester clip 34 has a generally flat shimlike portion 36 with a section removed to provide an opening 38 which receives the abutment tab 30 of the brake pad backing plate. A loop-spring portion 40 of the noise arrester clip engages a V-groove 42 formed in the end of the backing plate and resiliently urges an edge 44 of the opening into engagement with the underside of the abutment tab 30. A pair of locating tabs 46 position the noise arrester clip relative to the backing plate. To function properly and effectively, the noise arrester clip must engage the underside of the tab 30 along edge 44 and the backing plate 28 along its flat back. In many applications, it has been found that the clip is more effective in preventing audible vibrations if the shimlike portion 36 that engages the backside of the backing plate is bonded to the backing plate by a suitable adhesive. A thermoset bonding material having elastometric characteristics sufficient to accommodate deformations of the backing plate and the abutment tab, but yet not so pliable that the noise arrester clip shifts so far that its significant dampening characteristics are lost, has been found to be satisfactory. In the preferred embodiment, the angle of the abutment tab 30 relative to the remainder of the backing plate backside where it is engaged by the edge 44 is at approximately 35° to 45°. It has been found that spring steel shim stock of approximately about 0.010-inch thickness is satisfactory to fabricate the noise arrester clip.

OPERATION

This invention has been widely tested and used and is found to effectively reduce causes of audible vibrations or squeal during vehicle braking.

As indicated previously, the noise arrester clip must engage the underside of tab 30 along edge 44 and the backing plate 28 along its flat back. It is believed that the shimlike portion 36 of clip 34 functions as a dampener of the scissors-type vibrational movements between tab 30 and the remainder of backing plate 28, thereby affecting vibrations within the brake assembly.

The foregoing presents a preferred embodiment of the invention. Modifications and alterations will occur to those skilled in the art which are included within the scope of the following claims:

I claim:
1. A brake including:
    a brake pad assembly associated with a caliper assembly and having a backing plate and a friction pad secured to one side of said backing plate,
    said backing plate having at least one abutment tab protruding acutely from its other side;
    a noise arrestor having a shimlike portion interposing said other side of the backing plate and said caliper assembly, said shimlike portion having a plane parallel to said other side of the backing plate;
    an opening formed in the shimlike portion through which said abutment means protrudes, said opening including an edge engageable with an abutment tab along its line of intersection with the plane of said other side of the backing plate; and
    spring means engageable with said backing plate to urge said edge into engagement with said abutment tab.
2. In a disc brake according to claim 1;
    means to bond said shimlike portion of said noise arrester to said backing plate.
3. A brake including:
    a brake pad assembly associated with a caliper assembly and having a backing plate and a friction pad secured to one side of said backing plate;
    said backing plate having at least one abutment tab protruding acutely from its other side;

a noise arrestor having a shimlike portion interposing said other side of the backing plate and said caliper assembly, said shimlike portion having a plane parallel to said other side of the backing plate;

said shimlike portion including an edge engageable with an abutment tab along its line of intersection with the plane of said other side of the backing plate; and spring means engageable with said backing plate to urge said edge into engagement with said abutment tab.

4. In a disc brake according to claim 3;

means to bond said shimlike portion of said noise arrester to said backing plate.

5. In a disc brake having a caliper member, a brake pad assembly mounted on said caliper member including a backing plate and a friction pad secured to one side thereof;

a pair of abutment means protruding from the other side of said backing plate and being engageable with said caliper member to prevent movement of said brake pad assembly relative to caliper member in predetermined directions;

a pair of noise arresters each having a shimlike portion interposing said other side of the backing plate and said caliper assembly, said shimlike portions having a plane parallel to said other side of the backing plate;

an opening formed in each said shimlike portion receiving one of said abutment means, said opening including an edge engageable with an abutment tab along the line of intersection with the plane of said other side of the backing plate; and spring means engageable with said backing plate to urge said edge of each said opening into engagement with each of said abutment means.

6. In a disc brake according to claim 5;

means to bond each said shimlike portion of said noise arresters to said backing plate.

7. In a disc brake according to claim 6;

each of said abutment means comprising a tab forming an angle of less than 90° with the backing plate, said tabs sloping in generally opposite directions; and the ends of said tabs being engageable with said caliper member.

* * * * *